(12) United States Patent
Kanemoto (10) Patent No.: US 9,038,461 B2
(45) Date of Patent: May 26, 2015

(54) GYRO SENSOR AND ELECTRONIC DEVICE

(75) Inventor: Kei Kanemoto, Suwa (JP)

(73) Assignee: Seiko Epson Corporation (JP)

( * ) Notice: Subject to any disclaimer, the term of this patent is extended or adjusted under 35 U.S.C. 154(b) by 418 days.

(21) Appl. No.: 13/473,888

(22) Filed: May 17, 2012

(65) Prior Publication Data

US 2012/0291548 A1 Nov. 22, 2012

(30) Foreign Application Priority Data

May 20, 2011 (JP) ................................. 2011-113744

(51) Int. Cl.
  *G01C 19/56* (2012.01)
  *G01C 19/574* (2012.01)
  *G01C 19/5733* (2012.01)
(52) U.S. Cl.
  CPC .......... *G01C 19/574* (2013.01); *G01C 19/5733* (2013.01)
(58) Field of Classification Search
  USPC ...................................................... 73/504.12
  See application file for complete search history.

(56) References Cited

U.S. PATENT DOCUMENTS

| 5,349,855 A | 9/1994 | Bernstein et al. |
| 5,728,936 A * | 3/1998 | Lutz ............................ 73/504.14 |
| 7,421,897 B2 | 9/2008 | Geen et al. |
| 8,459,110 B2 * | 6/2013 | Cazzaniga et al. .......... 73/504.12 |
| 8,544,594 B2 * | 10/2013 | Yacine ........................... 181/121 |
| 2008/0276706 A1 * | 11/2008 | Hartmann et al. .......... 73/504.04 |
| 2011/0308314 A1 * | 12/2011 | Kempe ........................ 73/504.02 |

FOREIGN PATENT DOCUMENTS

| CA | 2753807 A1 | 9/2010 |
| JP | 2010-078397 A | 4/2010 |
| JP | 2010-266321 | 11/2010 |

* cited by examiner

*Primary Examiner* — John Chapman, Jr.
(74) *Attorney, Agent, or Firm* — Harness, Dickey & Pierce, P.L.C.

(57) ABSTRACT

A gyro sensor according to the invention includes a first mass portion including a first detection portion, a second mass portion including a second detection portion, first drive portions vibrating the first mass portion in a direction of a first axis, and a force conversion portion fixed to an anchor portion. The first mass portion and the second mass portion are connected with the force conversion portion. The force conversion portion is displaced with the anchor portion as an axis, and vibrates the second mass portion in a direction of a second axis crossing the first axis in a plane view.

9 Claims, 12 Drawing Sheets

GYRO SENSOR AND ELECTRONIC DEVICE

BACKGROUND

1. Technical Field

The present invention relates to a gyro sensor and an electronic device using the gyro sensor.

2. Related Art

Recently, many gyro sensors which detect angular velocity have been used for car navigation systems, or attitude control such as hand-shake correction of video cameras. Examples of such gyro sensors include a sensor in which detection elements capable of detecting the angular velocities about the X-axis, the Y-axis, and the Z-axis perpendicular to each other are provided for the respective axes.

A gyro sensor disclosed in JP-A-2010-266321 is a multi-axis angular velocity sensor which detects the angular velocities about first to third detection axes perpendicular to each other. The gyro sensor includes a first vibration-type angular velocity sensor element which detects the angular velocity about the first detection axis, a second vibration-type angular velocity sensor element which detects the angular velocity about the second detection axis, a third vibration-type angular velocity sensor element which detects the angular velocity about the third detection axis, an IC which controls the first to third vibration-type angular velocity sensor elements, and a package which contains the first to third vibration-type angular velocity sensor elements and the IC. In the gyro sensor, the vibration plane of the first vibration-type angular velocity sensor element is parallel to a first detection axis, the vibration plane of the second vibration-type angular velocity sensor element is parallel to a second detection axis, and the vibration plane of the third vibration-type angular velocity sensor element is perpendicular to a third detection axis, so that the gyro sensor is reduced in height.

However, gyro sensors in the related art have a problem that when respective axes are arranged in a chip for detecting the angular velocities about the three axes, the mounting area is increased, failing to achieve further miniaturization of a sensor element associated with the request for miniaturization of the entire device.

Moreover, since vibrations are independent in each of single-axis angular velocity sensors, a drive circuit has also to be disposed in each of the angular velocity sensors. Therefore, an integrated circuit (IC) is also needed separately, and the mounting area is increased, making it difficult to miniaturize the sensor. Moreover, since a vibration mode exists in each of the plurality of angular velocity sensors, there is a problem that the vibration modes interfere with each other.

SUMMARY

An advantage of some aspects of the invention is to provide a gyro sensor which is miniaturized.

APPLICATION EXAMPLE 1

This application example is directed to a gyro sensor including: a first mass portion including a first detection portion; a second mass portion including a second detection portion; a first drive portion vibrating the first mass portion in a direction of a first axis; and a force conversion portion fixed to an anchor portion, wherein the first mass portion and the second mass portion are connected with the force conversion portion, and the force conversion portion is displaced with the anchor portion as an axis, and vibrates the second mass portion in a direction of a second axis crossing the first axis in a plane view.

According to the configuration, driving in the direction of the first axis can be displaced by the force conversion portion so that the second mass portion vibrates in the direction of the second axis. With this configuration, since the drive portion for the plurality of mass portions can be commonly used, the miniaturization of the entire sensor can be achieved.

APPLICATION EXAMPLE 2

This application example is directed to the gyro sensor according to Application Example 1, wherein the force conversion portion includes a rotating body, an anchor beam connecting the anchor portion with the rotating body, a first connection beam connecting the rotating body with the first mass portion, and a second connection beam connecting the rotating body with the second mass portion, and the rotating body has rigidity higher than that of the anchor beam.

According to the configuration, vibration of the drive portion in the direction of the first axis can be easily converted to vibration in the direction of the second axis by the rotational motion of the force conversion portion.

APPLICATION EXAMPLE 3

This application example is directed to the gyro sensor according to Application Example 2, wherein the anchor beam includes a first anchor beam extending from the anchor portion in the direction of the first axis, and a second anchor beam extending from the anchor portion in the direction of the second axis, and the rotating body is a beam connecting an end of the first anchor beam with an end of the second anchor beam.

According to the configuration, the force conversion portion is configured using the plurality of beams, and vibration of the drive portion in the direction of the first axis can be easily converted to vibration in the direction of the second axis by the rotational motion of the force conversion portion.

APPLICATION EXAMPLE 4

This application example is directed to the gyro sensor according to Application Example 3, wherein the rotating body is disposed in an arc shape.

According to the configuration, by disposing the rotating body of the force conversion portion in an arc shape, the force conversion portion can be smoothly moved rotationally.

APPLICATION EXAMPLE 5

This application example is directed to the gyro sensor according to Application Example 2, wherein the rotating body has a cavity, and the anchor portion is arranged in the inside of the cavity.

According to the configuration, vibration of the drive portion in the direction of the first axis can be easily converted to vibration in the direction of the second axis by the rotational motion of the force conversion portion.

APPLICATION EXAMPLE 6

This application example is directed to the gyro sensor according to Application Example 2, wherein a set of the anchor portions are disposed with the rotating body interposed therebetween.

According to the configuration, vibration of the drive portion in the direction of the first axis can be easily converted to vibration in the direction of the second axis by the rotational motion of the force conversion portion.

APPLICATION EXAMPLE 7

This application example is directed to the gyro sensor according to Application Example 5 or 6, wherein the rotating body has a rectangle shape.

According to the configuration, by forming the rotating body in a rectangle shape, rotational displacement with the anchor portion as an axis can be increased, so that vibration efficiency can be improved.

APPLICATION EXAMPLE 8

This application example is directed to the gyro sensor according to any one of Application Examples 1 to 7, which further includes: a third mass portion facing the first mass portion on the first axis and including a third detection portion; and a second drive portion vibrating the third mass portion in the direction of the first axis opposite to the first mass portion, wherein the force conversion portion is connected between the second mass portion and the third mass portion, and uses vibrations of the first mass portion and the third mass portion in the direction of the first axis to vibrate the second mass portion in the direction of the second axis.

According to the configuration, vibration balance is improved, conversion from vibration in the direction of the first axis to vibration in the direction of the second axis can be increased, and therefore, the Q-value can be enhanced.

APPLICATION EXAMPLE 9

This application example is directed to the gyro sensor according to Application Example 8, which further includes: a fourth mass portion facing the second mass portion on the second axis and including a fourth detection portion, wherein the force conversion portion is connected between the third mass portion and the fourth mass portion, and between the first mass portion and the fourth mass portion, and the force conversion portion uses vibrations of the first mass portion and the third mass portion in the direction of the first axis to vibrate the second mass portion in the direction of the second axis and vibrate the fourth mass portion in the direction of the second axis opposite to the second mass portion.

According to the configuration, the first mass portion and the third mass portion, or the second mass portion and the fourth mass portion can be driven to vibrate in opposite directions from each other. Therefore, even when a physical quantity, such as acceleration, other than an angular velocity is applied for example, acceleration components can be cancelled out through differential detection, so that the accuracy of angular velocity detection can be enhanced.

APPLICATION EXAMPLE 10

This application example is directed to an electronic device including the gyro sensor according to any one of Application Examples 1 to 9.

According to the configuration, the drive portion for multi-axis detection is commonly used to achieve miniaturization, and the electronic device including the gyro sensor which can detect angular velocity with high accuracy can be obtained.

BRIEF DESCRIPTION OF THE DRAWINGS

The invention will be described with reference to the accompanying drawings, wherein like numbers reference like elements.

FIGS. 4A and 4B are explanatory views of detection of rotation acting about the X-axis, in which

FIGS. 5A and 5B are explanatory views of detection of rotation acting about the Y-axis, in which

DESCRIPTION OF EXEMPLARY EMBODIMENTS

Figure 1:
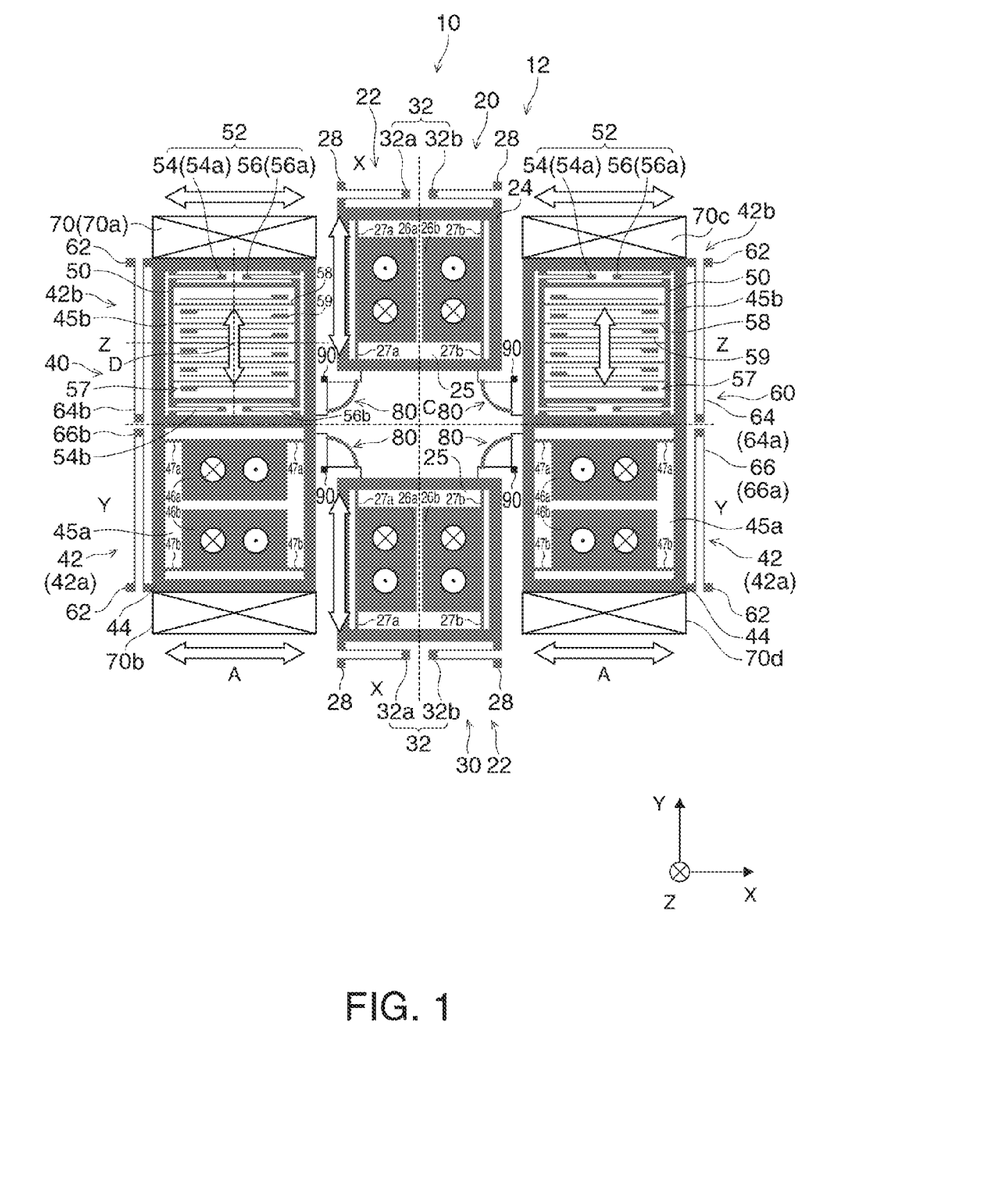
FIG. 1 is an explanatory view showing a schematic configuration of a gyro sensor according to the invention.

An embodiment of a gyro sensor and an electronic device according to the invention will be described in detail below with reference to the accompanying drawings. FIG. 1 is an explanatory view showing a schematic configuration of the gyro sensor according to the invention. Throughout the drawings, the X-axis, the Y-axis, and the Z-axis are illustrated as three axes perpendicular to each other for convenience of description. Moreover in the embodiment, a direction parallel to the X-axis (first axis) is referred to as an X-axis direction, a direction parallel to the Y-axis (second axis) is referred to as a Y-axis direction, and a direction parallel to the Z-axis (third axis) is referred to as a Z-axis direction.

The gyro sensor 10 shown in FIG. 1 mainly includes basically a first mass portion 40, a second mass portion 20, a third mass portion 60, a fourth mass portion 30, a drive portion 70, four force conversion portions 80, anchor portions 90, and drive spring portions 32, 64, and 66. The first mass portion 40 includes a first detection portion 42 which detects displacement about the second axis (Y-axis rotation detection) perpendicular to, in a plane view, the first axis formed on a vibration system structure 12 and displacement about the third axis (Z-axis rotation detection) perpendicular to each of the first axis and the second axis. The second mass portion 20 includes a second detection portion 22 which detects displacement about the first axis (X-axis rotation detection). The third mass portion 60 faces the first mass portion 40 in the first axis direction, and has a first detection portion 42. The fourth mass portion 30 faces the second mass portion 20 in the second axis direction, and has a second detection portion 22.

The drive portion 70 has first drive portions 70a and 70b which drive the first mass portion 40 in the direction of the first axis and second drive portions which vibrate the third mass portion 60 in the first axis direction opposite to the first mass portion 40. The four force conversion portions 80 each connect adjacent ones of the first to fourth mass portions. The anchor portions 90 fix the force conversion portions 80. The term "displacement" used herein includes displacement due to rotational motion, for example.

The vibration system structure 12 serving as a substrate is composed of silicon as a main material. The portions described above are integrally formed on a silicon substrate (silicon wafer) by processing them into a desired outer shape using a thin-film forming technique (for example, a deposition technique such as an epitaxial growth technique or a chemical vapor deposition technique) or various kinds of processing techniques (for example, an etching technique such as dry etching or wet etching). Alternatively, the portions described above can be formed by bonding a silicon substrate and a glass substrate together, and then processing only the silicon substrate into a desired outer shape. By using silicon as the main material of the vibration system structure 12, it is possible to realize excellent vibration characteristics and show excellent durability. Moreover, it is possible to apply a minute processing technique used for manufacturing silicon semiconductor devices, so that the miniaturization of the gyro sensor 10 can be achieved.

First, the portion which detects rotation acting about the first axis (X-axis) will be described.

The second detection portion 22 disposed in the second mass portion 20 and capable of detecting rotation acting about the X-axis includes a second frame 24 and displacement plates 26a and 26b as shown in FIG. 1.

The second frame 24 includes a cavity 25 in the inside thereof, and is substantially a rectangular frame in a plane view with the Z-axis as the normal. The second frame 24 is connected, at a side face crossing the Y-axis in the plane view with the Z-axis as the normal, to the drive spring portion 32.

In the cavity 25 of the second frame 24, the pair of displacement plates 26a and 26b are disposed. The displacement plates 26a and 26b are coupled with rotating shafts 27a and 27b to side faces of the second frame 24 perpendicular to the Y-axis direction. The rotating shafts 27a and 27b are formed at positions shifted from the centers of gravity of the displacement plates 26a and 26b, respectively. The rotating shafts 27a and 27b are both disposed such that the direction of rotation is along the Y-axis direction. When displacement is applied, the rotating shafts 27a and 27b are torsionally deformed about their axes to rotate the displacement plates 26a and 26b in the Z-axis direction. Moreover, the displacement plates 26a and 26b are mounted so that the directions of rotation of the displacement plates 26a and 26b due to the gravity (displacement in the Z-axis direction) are opposite to each other with respect to the rotating shafts 27a and 27b. In other words, it can be said that a direction of shift of the rotating shaft 27a from the centers of gravity of the displacement plate 26a and a direction of shift of the rotating shaft 27b from the centers of gravity of the displacement plate 26b are opposite to each other. A lower electrode (not shown) is disposed at portions facing the displacement plates 26a and 26b with a predetermined gap between the lower electrodes and the displacement plates 26a and 26b.

The fourth mass portion 30 has a configuration similar to that of the second mass portion 20, and includes the second detection portion 22 capable of detecting rotation acting about the X-axis (the first axis). The second mass portion 20 and the fourth mass portion 30 are mounted so as to face each other on the Y-axis. The drive spring portion 32 is formed outside of the second mass portion 20 and the fourth mass portion 30. The drive spring portion 32 couples a second frame 24 with a fixed portion 28. The drive spring portion 32 is composed of a pair of drive spring portions 32a and 32b. Each of the drive spring portions 32a and 32b has a shape of extending in the Y-axis direction while reciprocating in the X-axis direction. Moreover, the drive spring portions 32a and 32b are disposed, in the XY-plane view with the Z-axis as the normal, symmetrically about the X-axis crossing the center C of the vibration system structure 12. By forming each of the drive spring portions 32a and 32b in such a shape, the second mass portion 20 and the fourth mass portion 30 can be smoothly expanded and contracted in the Y-axis direction while suppressing their deformation in the X-axis direction and the Z-axis direction.

Next, the portion which detects rotation acting about the second axis (Y-axis) and the third axis (Z-axis) will be described. Specifically, the first detection portion 42 disposed in the first mass portion 40 and capable of detecting rotation acting about the Y-axis or/and the Z-axis will be described.

First, a first detection portion 42a capable of detecting rotation acting about the Y-axis has, as shown in FIG. 1, a pair of displacement plates 46a and 46b disposed in a cavity 45a of a first frame 44. The displacement plates 46a and 46b are coupled with rotating shafts 47a and 47b to side faces of the first frame 44 perpendicular to the X-axis direction. The rotating shafts 47a and 47b are formed at positions shifted from the centers of gravity of the displacement plates 46a and 46b, respectively. The rotating shafts 47a and 47b are both disposed such that the direction of rotation is along the X-axis direction. When displacement is applied, the rotating shafts 47a and 47b are torsionally deformed about their axes to rotate the displacement plates 46a and 46b in the Z-axis direction. Moreover, the displacement plates 46a and 46b are mounted so that the directions of rotation of the displacement plates 46a and 46b due to the gravity (displacement in the Z-axis direction) are opposite to each other with respect to the rotating shafts 47a and 47b. In other words, it can be said that a direction of shift of the rotating shafts 47a and 47b from the centers of gravity of the displacement plates 46a and 46b and a direction of shift of the rotating shafts 47a and 47b from the centers of gravity of the displacement plates 46a and 46b are opposite to each other. A lower electrode (not shown) is disposed at portions facing the displacement plates 46a and 46b with a predetermined gap between the lower electrodes and the displacement plates 46a and 46b.

A first detection portion 42b capable of detecting rotation acting about the Z-axis has, as shown in FIG. 1, an inner frame portion 50, a spring portion 52, and a detection portion 57 disposed within the first frame 44.

The inner frame portion 50 is disposed in a cavity 45b of the first frame 44, and surrounded by the first frame 44 at its outer periphery. The inner frame portion 50 is substantially a rectangular frame in the plane view with the Z-axis as the normal, and connected, at side faces crossing the Y-axis, to the first frame 44 via the spring portion 52.

The spring portion 52 is composed of a first spring portion 54 and a second spring portion 56. The first spring portion 54 is composed of a pair of first spring portions 54a and 54b. Each of the first spring portions 54a and 54b has a shape of extending in the Y-axis direction while reciprocating in the X-axis direction. Moreover, the first spring portions 54a and 54b are disposed, in the plane view with the Z-axis as the normal, symmetrically about the X-axis crossing the center D of the first frame 44. By forming each of the first spring portions 54a and 54b in such a shape, the first spring portion 54 can be smoothly expanded and contracted in the Y-axis direction as a detection direction while suppressing its deformation in the X-axis direction and the Z-axis direction. Moreover, the second spring portion 56 is disposed symmetrically to the first spring portion 54 about the Y-axis crossing the center D of the first detection portion 42b, and composed of a pair of second spring portions 56a and 56b. By forming each of the second spring portions 56a and 56b in such a shape, the second spring portion 56 can be smoothly expanded and contracted in the Y-axis direction as a detection direction while suppressing its deformation in the X-axis direction and the Z-axis direction.

The detection portion 57 is composed of movable electrodes 58 and fixed electrodes 59. The movable electrodes 58 are disposed such that each of the movable electrodes is connected, at both ends, to the inner frame portion 50 along the X-axis direction as a drive direction, and that the movable electrodes next to each other are disposed with a predetermined gap therebetween. Each of the fixed electrodes 59 is disposed in the gap between the movable electrodes 58 along the X-axis direction as a drive direction, and fixed to an anchor of a lower substrate (not shown). The movable electrodes 58 and the fixed electrodes 59 described above are formed in a comb shape in which the movable electrode 58 and the fixed electrode 59 are alternately arranged. In the detection portion 57 having the configuration described above, a voltage is applied to the electrodes by a power source (not shown), whereby electrostatic force is generated between each of the movable electrodes 58 and each of the fixed electrodes 59. When the inner frame portion 50 is displaced in the Y-axis direction, the movable electrode 58 moves closer to or away from the fixed electrode 59, thereby changing an electrostatic capacitance. By detecting the change in electrostatic capacitance, the displacement amount in the Y-axis direction can be obtained.

The third mass portion 60 has a configuration similar to that of the first mass portion 40, and includes the first detection portion 42 capable of detecting rotation acting about the Y-axis or/and the Z-axis. The first mass portion 40 and the third mass portion 60 are mounted so as to face each other on the X-axis. The drive spring portions 64 and 66 are disposed outside of the first mass portion 40 and the third mass portion 60. The drive spring portions 64 and 66 couple a first frame 44 with a fixed portion 62. The drive spring portion 64 is composed of a pair of drive spring portions 64a and 64b. Each of the drive spring portions 64a and 64b has a shape of extending in the X-axis direction while reciprocating in the Y-axis direction. Moreover, the drive spring portions 64a and 64b are disposed, in the plane view with the Z-axis as the normal, symmetrically about the Y-axis crossing the center C of the first frame 44. By forming each of the drive spring portions 64a and 64b in such a shape, the drive spring portion 64 can be smoothly expanded and contracted in the X-axis direction as a drive direction A while suppressing its deformation in the Y-axis direction and the Z-axis direction.

The drive spring portion 66 is disposed symmetrically to the drive spring portion 64 about the X-axis crossing the center C of the first frame 44, and composed of a pair of drive spring portions 66a and 66b. By forming each of the drive spring portions 66a and 66b in such a shape, the drive spring portion 66 can be smoothly expanded and contracted in the X-axis direction as a drive direction while suppressing their deformation in the Y-axis direction and the Z-axis direction.

Each of the first mass portion 40 and the third mass portion 60 can be configured to include any one of the first detection portions 42a and 42b capable of detecting rotation acting about the Y-axis and the Z-axis.

The drive portion 70 has a function of vibrating the first frame 44 in the X-axis direction at a predetermined frequency. That is, the drive portion 70 vibrates the first frame 44 so as to repeat the state of displacing the first frame 44 toward the +X-axis direction and the state of displacing the first frame 44 toward the −X-axis direction. The drive portion 70 is composed of drive electrodes and fixed electrodes (none of them shown). One drive portion 70 is disposed on a side face crossing the Y-axis. In addition, as long as the drive portion has a configuration capable of vibrating the first frame in the X-direction, when the drive portion is configured so as to be disposed on both side faces crossing the Y-axis, more stabilized drive motion can be performed. The fixed electrode has a pair of comb-shaped electrode pieces arranged to face each other in the X-axis direction via the drive electrode. The drive portion 70 having such a configuration generates electrostatic force between each of the drive electrodes and each of the electrode pieces by applying a voltage to the electrode pieces with a power source (not shown), and vibrates the first frame 44 at a predetermined frequency in the X-axis direction while expanding and contracting the drive spring portion. An electrostatic driving system, a piezoelectric driving system, an electromagnetic driving system using the Lorentz force in a magnetic field, or the like can be applied to the drive portion 70.

The drive portion 70 has a pair of first drive portions 70a and 70b mounted on side faces of the first mass portion 40 crossing the Y-axis direction, and a pair of second drive portions 70c and 70d mounted on side faces of the third mass portion 60 crossing the Y-axis direction. Alternating voltages whose phases are shifted from each other by 180 degrees are applied to the drive portions 70a and 70b of the first mass portion 40 and the drive portions 70c and 70d of the third mass portion 60, whereby electrostatic force is generated between each of the drive electrodes and each of the electrode pieces. When the drive spring portions 64 and 66 expand and contract in the X-axis direction, the first mass portion 40 and the third mass portion 60 can be vibrated in opposite phases from each other at a predetermined frequency in the X-axis direction. It is sufficient that only one of the first drive portions 70a and 70b is formed. The same applies to the second drive portions 70c and 70d.

Figure 2:
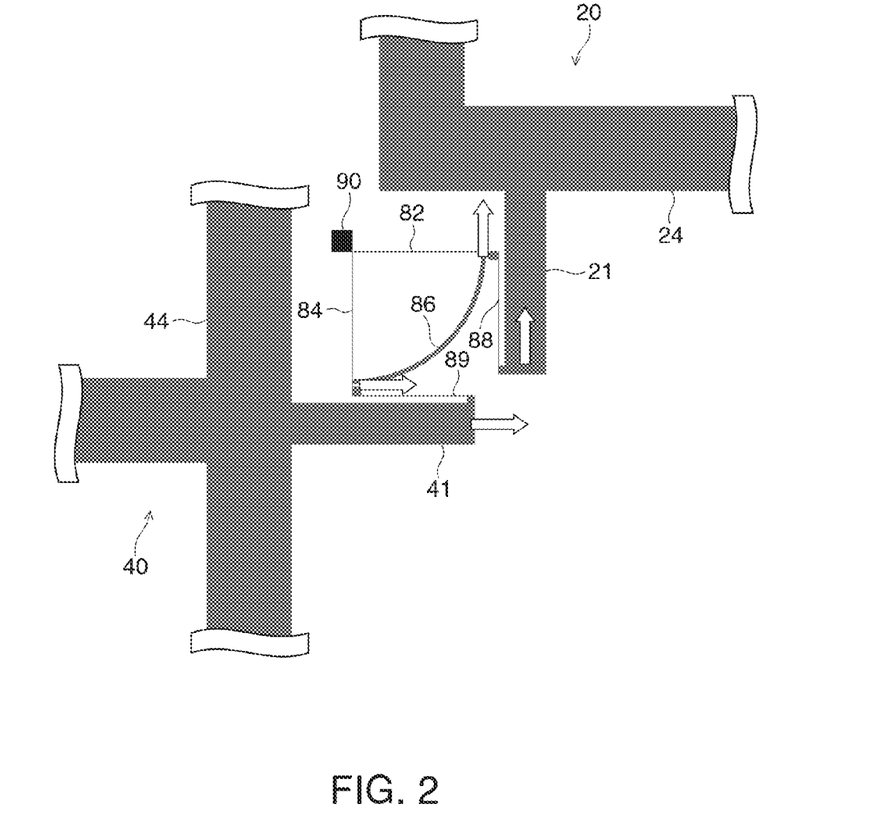
FIG. 2 is an explanatory view showing a schematic configuration of a force conversion portion.

The force conversion portions 80 are each disposed between the second mass portion 20 and the first mass portion 40, between the first mass portion 40 and the fourth mass portion 30, between the fourth mass portion 30 and the third mass portion 60, and between the third mass portion 60 and the second mass portion 20. FIG. 2 is an explanatory view showing a schematic configuration of the force conversion portion. FIG. 2 shows the force conversion portion 80 connected between the second mass portion 20 and the first mass portion 40. The force conversion portion 80 includes a first anchor beam 82 extending from the anchor portion 90 in the direction of the first axis, a second anchor beam 84 extending from the anchor portion 90 in the direction of the second axis, a beam (rotating body) 86 connecting an end of the first anchor beam 82 with an end of the second anchor beam 84 and having rigidity higher than that of the first anchor beam 82 and the second anchor beam 84, a first connection beam 89 connecting the beam 86 with the first mass portion 40 or the third mass portion 60, and a second connection beam 88 connecting the beam 86 with the second mass portion 20 or the fourth mass portion 30.

The anchor portion 90 is a member fixing the force conversion portion 80, and adhesively fixed to the lower substrate (not shown). One end of the first anchor beam 82 is connected to the anchor portion 90, while the other end extends in the X-axis direction. One end of the second anchor beam 84 is connected to the anchor portion 90, while the other end extends in the Y-axis direction. The other ends of the first anchor beam 82 and the second anchor beam 84 are connected to the beam 86 serving as a rotating body. The beam 86 is formed in an arc shape, and has rigidity higher than that of the first anchor beam 82 and the second anchor beam 84. The second mass portion 20 has a second protruding portion 21 formed on a side face crossing the Y-axis. The second protruding portion 21 extends along the Y-axis direction. The first mass portion 40 has a first protruding portion 41 formed on a side face crossing the X-axis. The first protruding portion 41 extends along the X-axis direction. The second connection beam 88 is connected to an end of the beam 86 and the second protruding portion 21. The first connection beam 89 is connected to the other end of the beam 86 and the first protruding portion 41. A protrusion for beam connection is disposed at tips of the first protruding portion 41 and the second protruding portion 21.

Figure 3A:
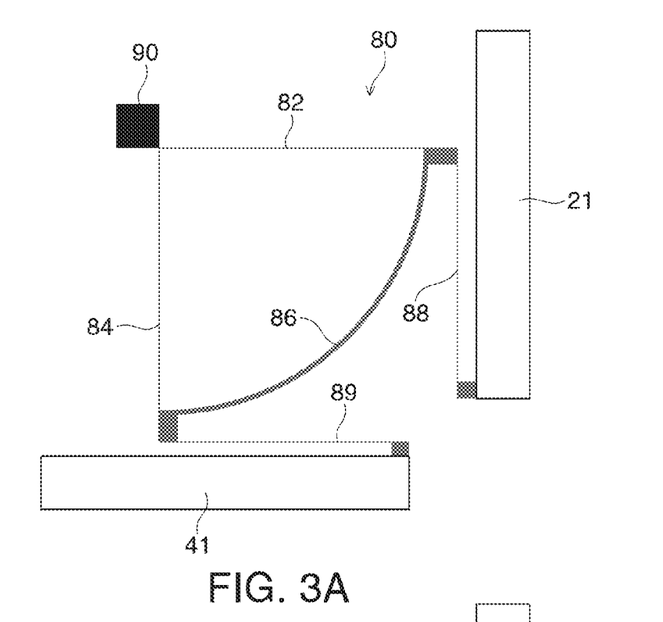
FIGS. 3A and 3B are explanatory views of operation of the force conversion portion.
Figure 3B:
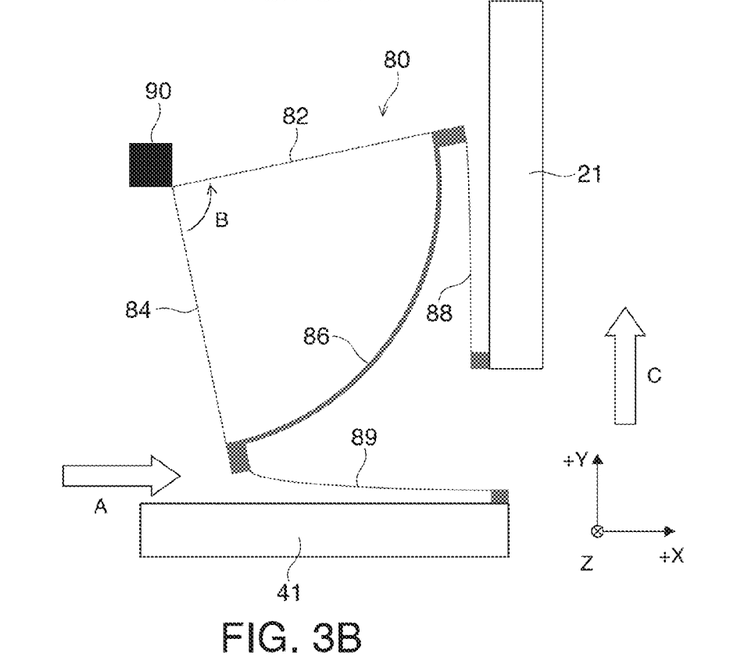

FIGS. 3A and 3B are explanatory views of operation of the force conversion portion, in which FIG. 3A shows an initial state, and FIG. 3B shows a state of moving toward the +X-axis direction. When the first mass portion in the initial state shown in FIG. 3A moves toward the +X-axis direction (arrow A), the force conversion portion 80 rotates, with the anchor portion 90 as an axis, in a direction of the arrow B together with the first anchor beam 82 and the second anchor beam 84 in a state where the beam 86 having high rigidity keeps its shape. The first connection beam 89 deforms, on its side connecting with the second anchor beam 84, so as to bend toward the +Y-axis direction from the initial state. On the other hand, the second connection beam 88 moves toward the arrow-C-direction together with the second protruding portion 21, and bends, on its side connecting with the second anchor beam 84, toward the −X-axis direction.

Operation of the thus configured gyro sensor 10 according to the invention will be described below.

Generally, the Coriolis force can be expressed by the following Mathematical Formula (1):

$$Fcori = 2mv \times \Omega \quad (1)$$

where Fcori represents the Coriolis force; m represents the mass; v represents the velocity; and Ω represents the angular velocity.

Figure 4A:
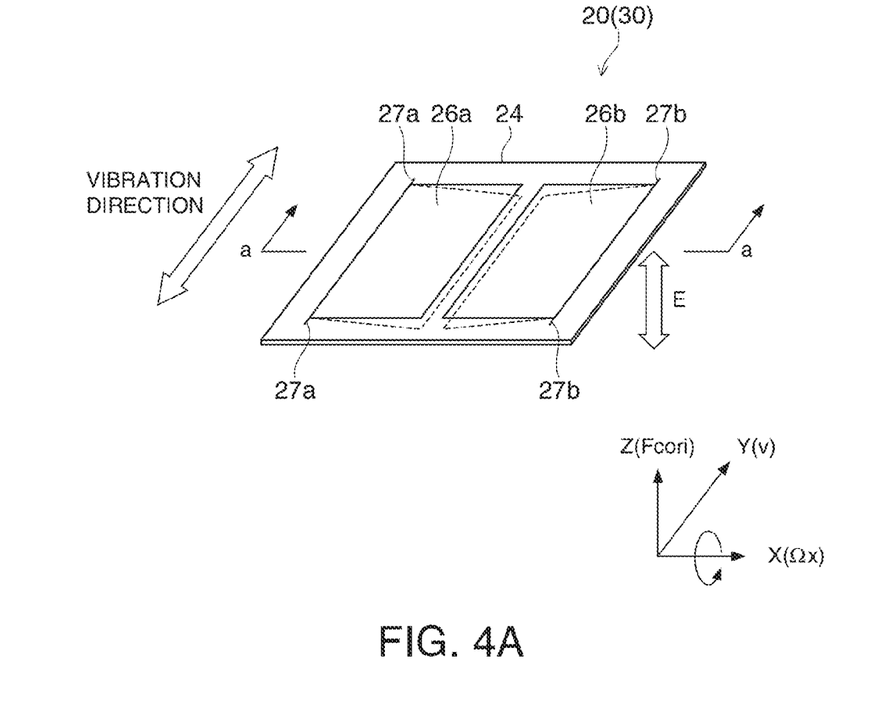
FIG. 4A is a perspective view.
Figure 4B:
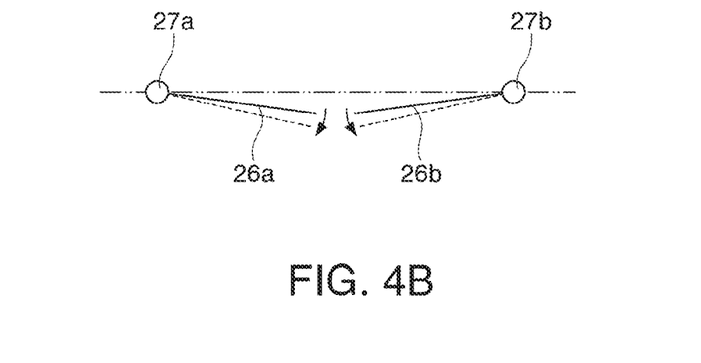
FIG. 4B is a cross-sectional view taken along line a-a of FIG. 4A.

FIGS. 4A and 4B are explanatory views of detection of rotation acting about the X-axis, in which FIG. 4A is a perspective view, and FIG. 4B is a cross-sectional view taken along line a-a of FIG. 4A. The first mass portion and the third mass portion are driven in the drive direction A by the drive portion. In this case, the drive portion drives the first mass portion and the third mass portion in opposite directions from each other. The second mass portion 20 and the fourth mass portion 30 connected to the first mass portion and the third mass portion via the force conversion portions vibrate in the Y-axis direction because vibrations in the drive direction A are displaced with the anchor portions as axes.

Then, when the angular velocity (Ωx) about the axis of the X-axis direction is input, the Coriolis force acts in the ±Z-axis directions (arrow E). When the Coriolis force acts in the Z-axis direction, the displacement plates 26a and 26b move closer to or away from the lower electrodes to thereby change an electrostatic capacitance. The change in electrostatic capacitance is detected to obtain the Coriolis force in the Z-axis direction, whereby rotation acting about the X-axis can be detected. The vibration frequency of the second and fourth mass portions in the Y-axis direction coincides with the vibration frequency of the first and third mass portions. Moreover, since the second and fourth mass portions are connected to the first mass portion and the third mass portion via the force conversion portions, it is no need to dispose a drive portion in the second mass portion and the fourth mass portion. Therefore, the drive portion for multi-axis detection can be commonly used, and therefore, the miniaturization of the entire sensor can be achieved.

Figure 5A:
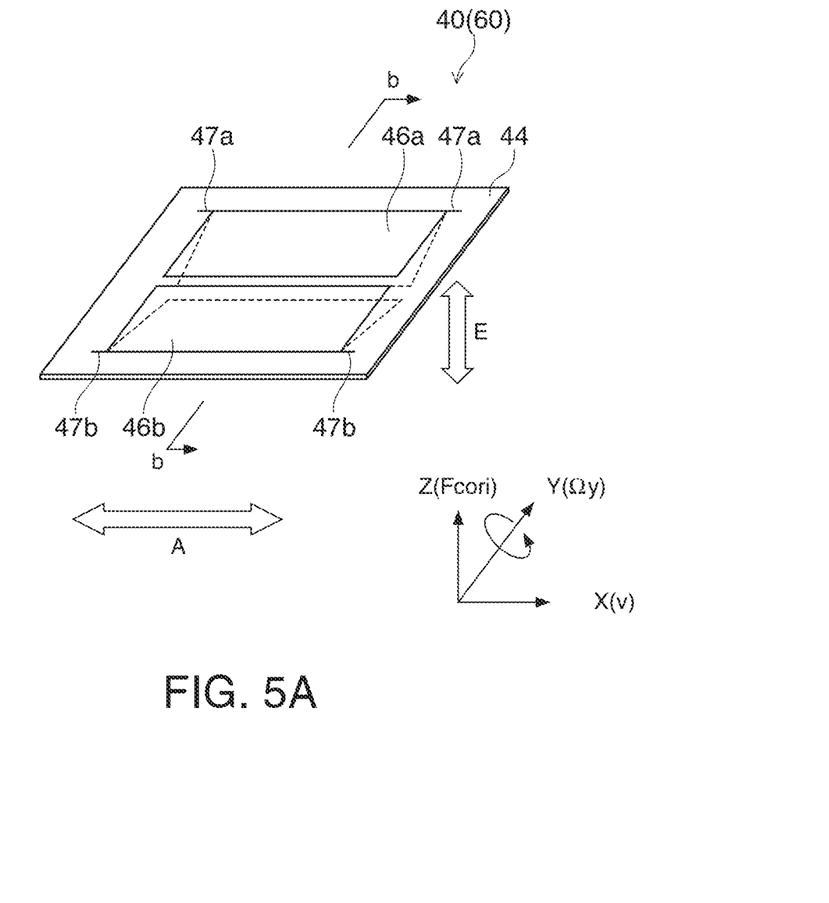
FIG. 5A is a perspective view.
Figure 5B:
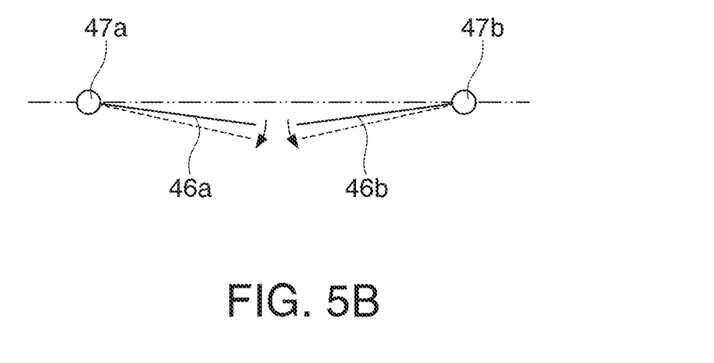
FIG. 5B is a cross-sectional view taken along line b-b of FIG. 5A.

FIGS. 5A and 5B are explanatory views of detection of rotation acting about the Y-axis, in which FIG. 5A is a perspective view, and FIG. 5B is a cross-sectional view taken along line b-b of FIG. 5A. The first mass portion 40 and the third mass portion 60 are driven in the drive direction A by the drive portion. Then, when the angular velocity (Ωy) about the axis of the Y-axis direction is input, the Coriolis force acts in the ±Z-axis directions (E). When the Coriolis force acts in the Z-axis direction, the displacement plates 46a and 46b move closer to or away from the lower electrodes to thereby change an electrostatic capacitance. The change in electrostatic capacitance is detected to obtain the Coriolis force in the Z-axis direction, whereby rotation acting about the Y-axis can be detected.

Figure 6:
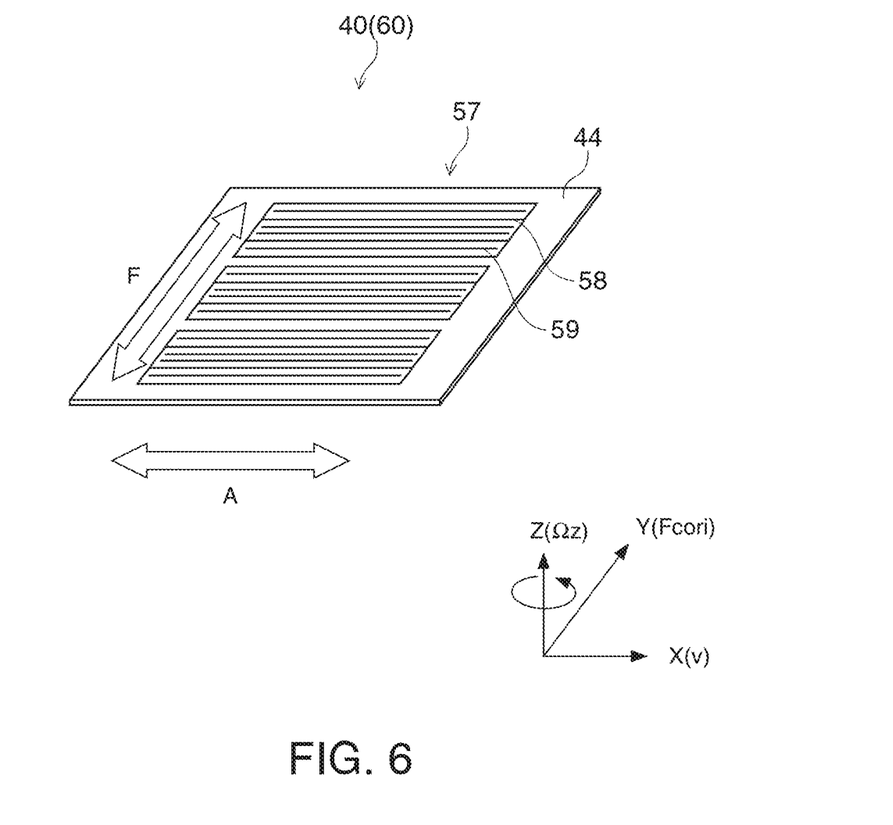
FIG. 6 is an explanatory view of detection of rotation acting about the Z-axis.

FIG. 6 is an explanatory view of detection of rotation acting about the Z-axis. The first mass portion 40 and the third mass portion 60 are driven in the drive direction A by the drive portion. Then, when the angular velocity (Ωz) is input about the axis of the Z-axis direction, the Coriolis force acts in the ±Y-axis directions (arrow F). When the Coriolis force acts in the Y-axis direction, the movable electrode 58 moves closer to or away from the fixed electrode in the detection portion 57 to thereby change an electrostatic capacitance. The change in electrostatic capacitance is detected to obtain the Coriolis force in the Y-axis direction, whereby rotation acting about the Z-axis can be detected.

According to the gyro sensor 10 described above, the drive portion for multi-axis detection can be commonly used to achieve the miniaturization of the entire sensor.

Figure 7:
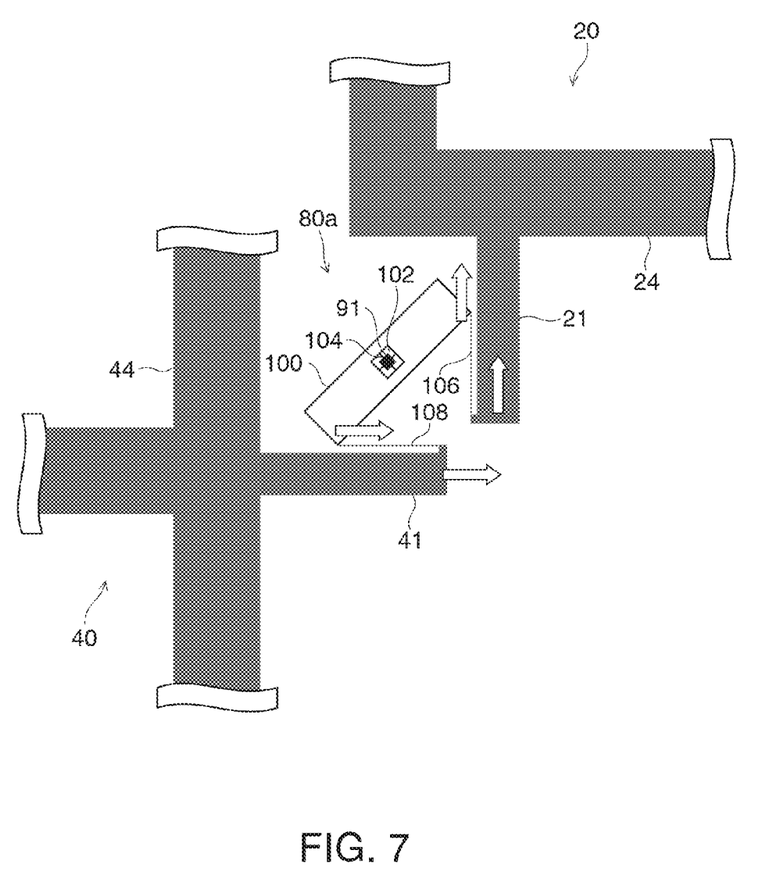
FIG. 7 is an explanatory view of a first modified example of a force conversion portion.

FIG. 7 is an explanatory view of a first modified example of a force conversion portion. FIG. 7 shows the force conversion portion connected between the first mass portion 40 and the second mass portion 20. The force conversion portion 80a of the first modified example includes, as shown in the drawing, a rotating body 100 including a cavity 102, springs 104 as anchor beams expandably and contractably connecting an anchor portion 91 arranged in the cavity 102 with side faces of the cavity 102 therebetween, a second connection beam 106 connecting one end of the rotating body 100 with the second mass portion 20, and a first connection beam 108 connecting the other end of the rotating body 100 with the first mass portion 40.

The rotating body 100 is substantially a rectangular member including the cavity 102 larger than the anchor portion 91 at the central portion in the plane view with the Z-axis as the normal, and has rigidity higher than that of the first connection beam 108 and the second connection beam 106. In the cavity 102, the anchor portion 91 arranged in the cavity and the expandable and contractable springs 104 are mounted in a cross shape. One end of the second connection beam 106 is connected to the rotating body 100, while the other end extends in the Y-axis direction to connect with the second protruding portion 21. One end of the first connection beam 108 is connected to the rotating body 100, while the other end extends in the X-axis direction to connect with the first protruding portion 41.

Figure 8A:
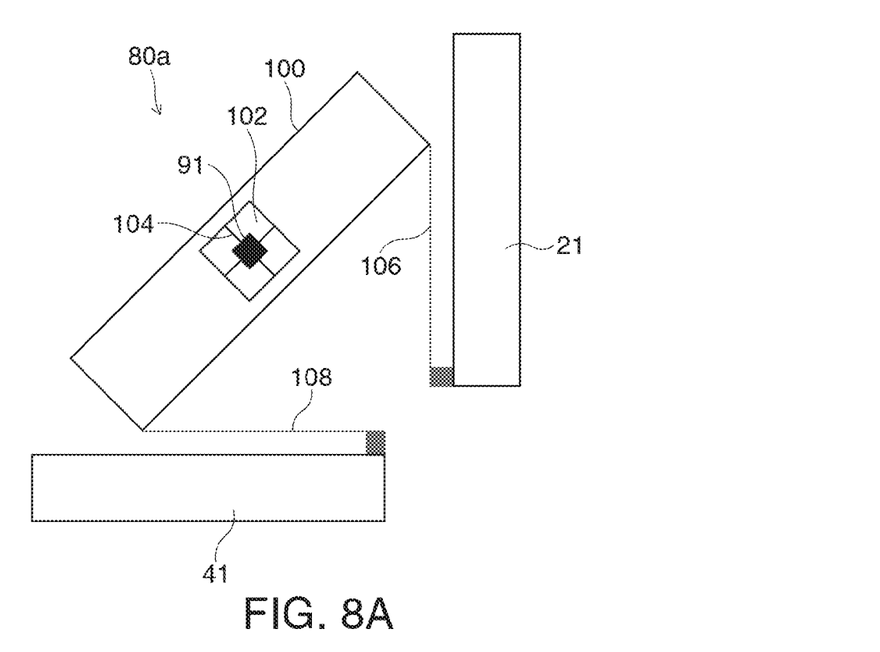
FIGS. 8A and 8B are explanatory views of operation of the first modified example of the force conversion portion.
Figure 8B:
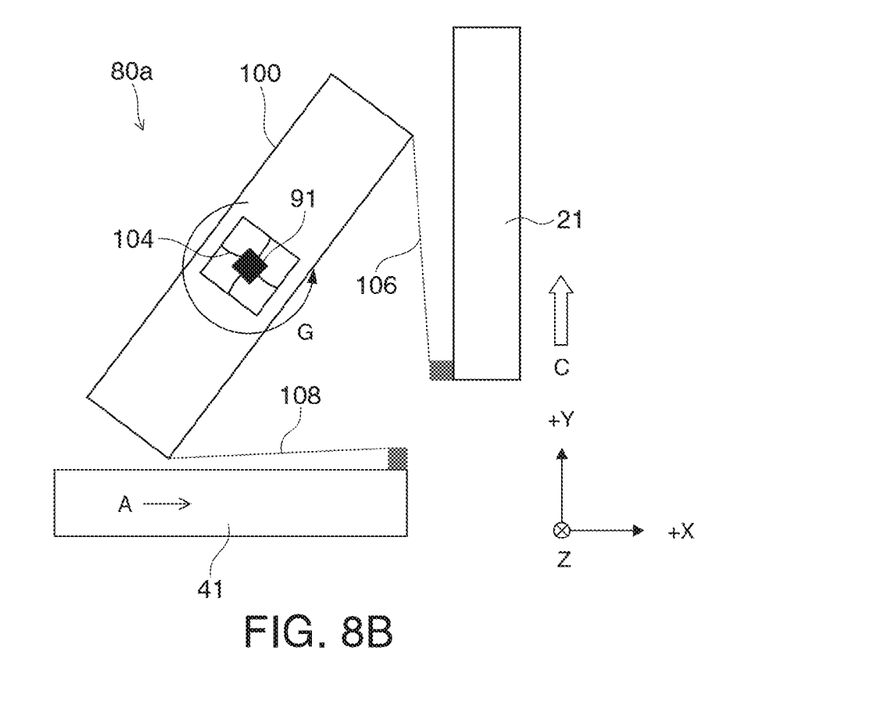

FIGS. 8A and 8B are explanatory views of operation of the first modified example of the force conversion portion, in which FIG. 8A shows an initial state, and FIG. 8B shows a state of moving toward the +X-axis direction. When the first mass portion in the initial state shown in FIG. 8A moves toward the +X-axis direction (arrow A) as shown in FIG. 8B, the first connection beam 108 moves toward the +X-axis direction together with the first protruding portion 41, and the rotating body 100 connected to the first connection beam 108 rotates, with the springs 104 bending, like the arrow G with the anchor portion 91 as an axis. The first connection beam 108 bends toward a direction closer to the first protruding portion 41. The second connection beam 106 connected to the rotating body 100 moves toward the +Y-axis direction with the rotation of the rotating body 100. The second connection beam 106 bends toward a direction away from the second protruding portion 21. Then, the second protruding portion 21 connected to the second connection beam 106 moves toward the +Y-axis direction (arrow C).

Figure 9:
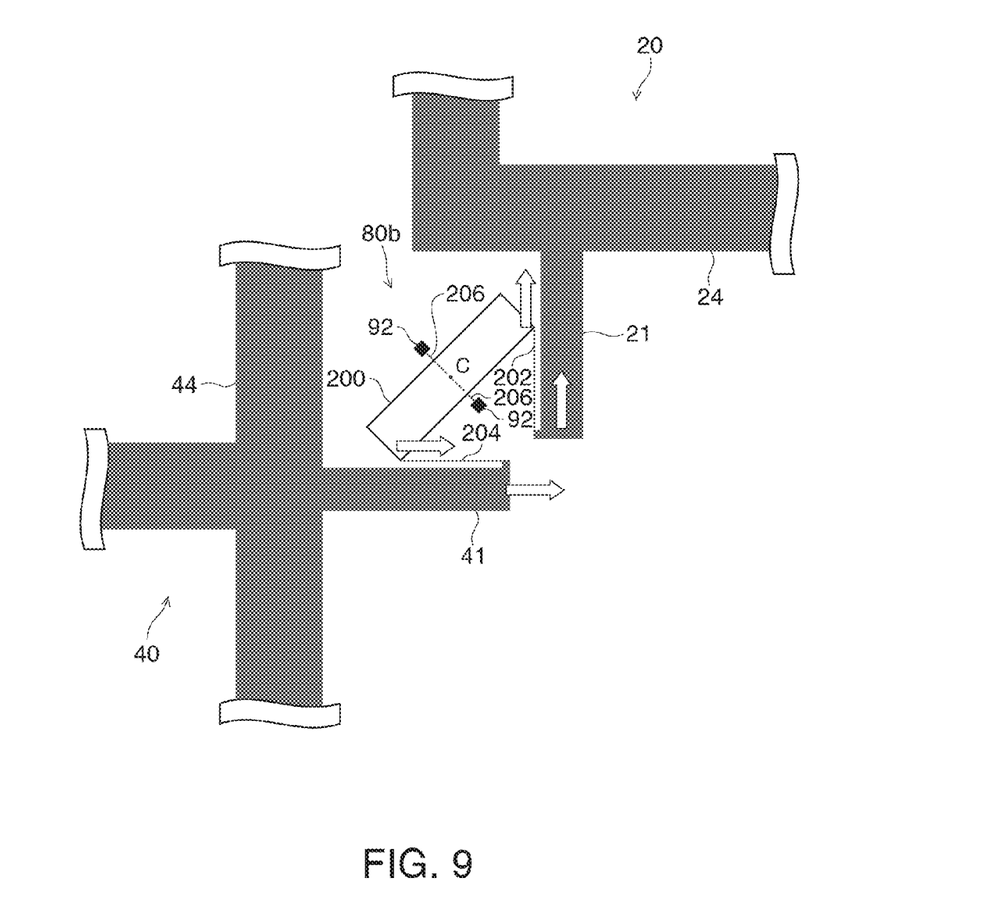
FIG. 9 is an explanatory view of a second modified example of a force conversion portion.

FIG. 9 is an explanatory view of a second modified example of a force conversion portion. FIG. 9 shows the force conversion portion 80b connected between the first mass portion 40 and the second mass portion 20. As shown in the drawing, the force conversion portion 80b of the second modified example includes a rotating body 200, a second connection beam 202, a first connection beam 204, and springs 206. Moreover, a pair of anchor portions 92 are arranged so as to face each other with the rotating body 200 as the center.

The rotating body 200 is substantially a rectangular member in the plane view with the Z-axis as the normal, and has rigidity higher than that of the second connection beam 202 and the first connection beam 204. One end of the second connection beam 202 is connected to the rotating body 200, while the other end extends in the Y-axis direction to connect with the second protruding portion 21. One end of the first connection beam 204 is connected to the rotating body 200, while the other end extends in the X-axis direction to connect with the first protruding portion 41. The springs 206 expandably and contractably connect between the anchor portions 92 and the rotating body 200 on a straight line passing through the pair of anchor portions 92.

Figure 10A:
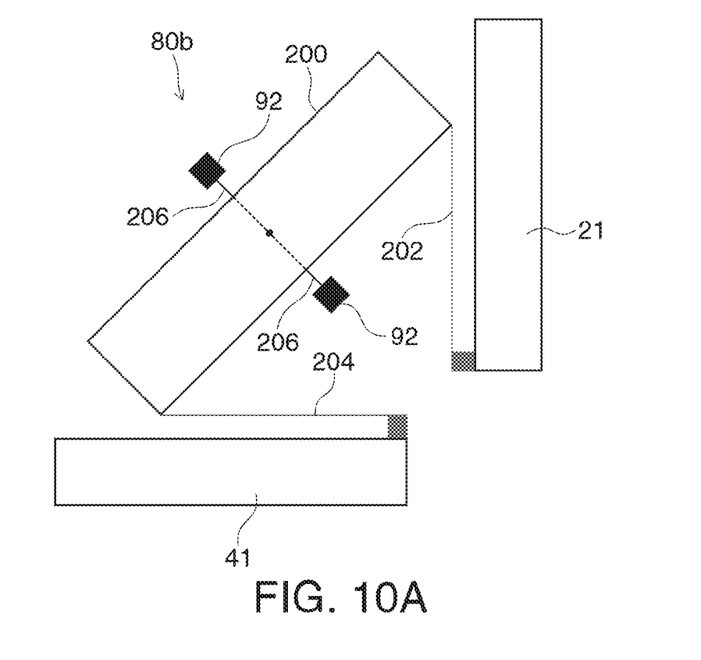
FIGS. 10A and 10B are explanatory views of operation of the second modified example of the force conversion portion.
Figure 10B:
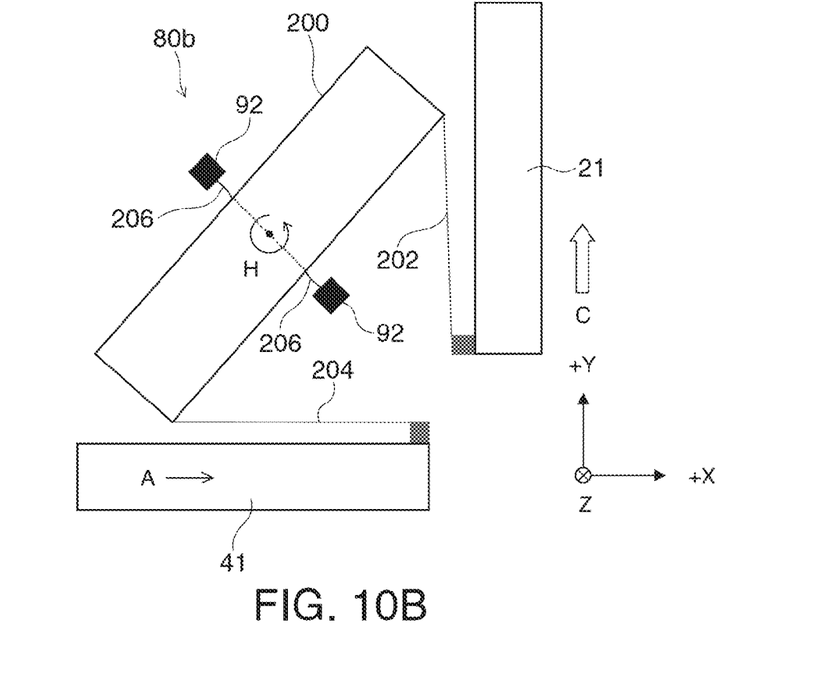

FIGS. 10A and 10B are explanatory views of operation of the second modified example of the force conversion portion, in which FIG. 10A shows an initial state, and FIG. 10B shows a state of moving toward the +X-axis direction. When the first mass portion in the initial state shown in FIG. 10A moves toward the +X-axis direction (arrow A) as shown in FIG. 10B, the first connection beam 204 moves toward the +X-axis direction together with the first protruding portion 41, and the rotating body 200 connected to the first connection beam 204 rotates, with the springs 206 bending, like the arrow H with the anchor portions 92 as axes. The first connection beam 204 bends toward a direction closer to the first protruding portion 41. The second connection beam 202 connected to the rotating body 200 moves toward the +Y-axis direction with the rotation of the rotating body 200. The second connection beam 202 bends toward a direction away from the second protruding portion 21. The second protruding portion 21 connected to the second connection beam 202 moves toward the +Y-axis direction (arrow C).

Moreover as shown in FIGS. 7 to 10B, by forming the rotating body in a rectangle shape, rotational displacement with the anchor portion as an axis can be increased, so that vibration efficiency of converting vibration in the first axis direction to vibration in the second axis direction can be increased.

In FIG. 1, although the second mass portion 20 and the fourth mass portion 30 are arranged between the first mass portion 40 and the third mass portion 60, the second mass portion 20 and the fourth mass portion 30 may be arranged outside of the first mass portion 40 and the third mass portion 60.

Figure 11:
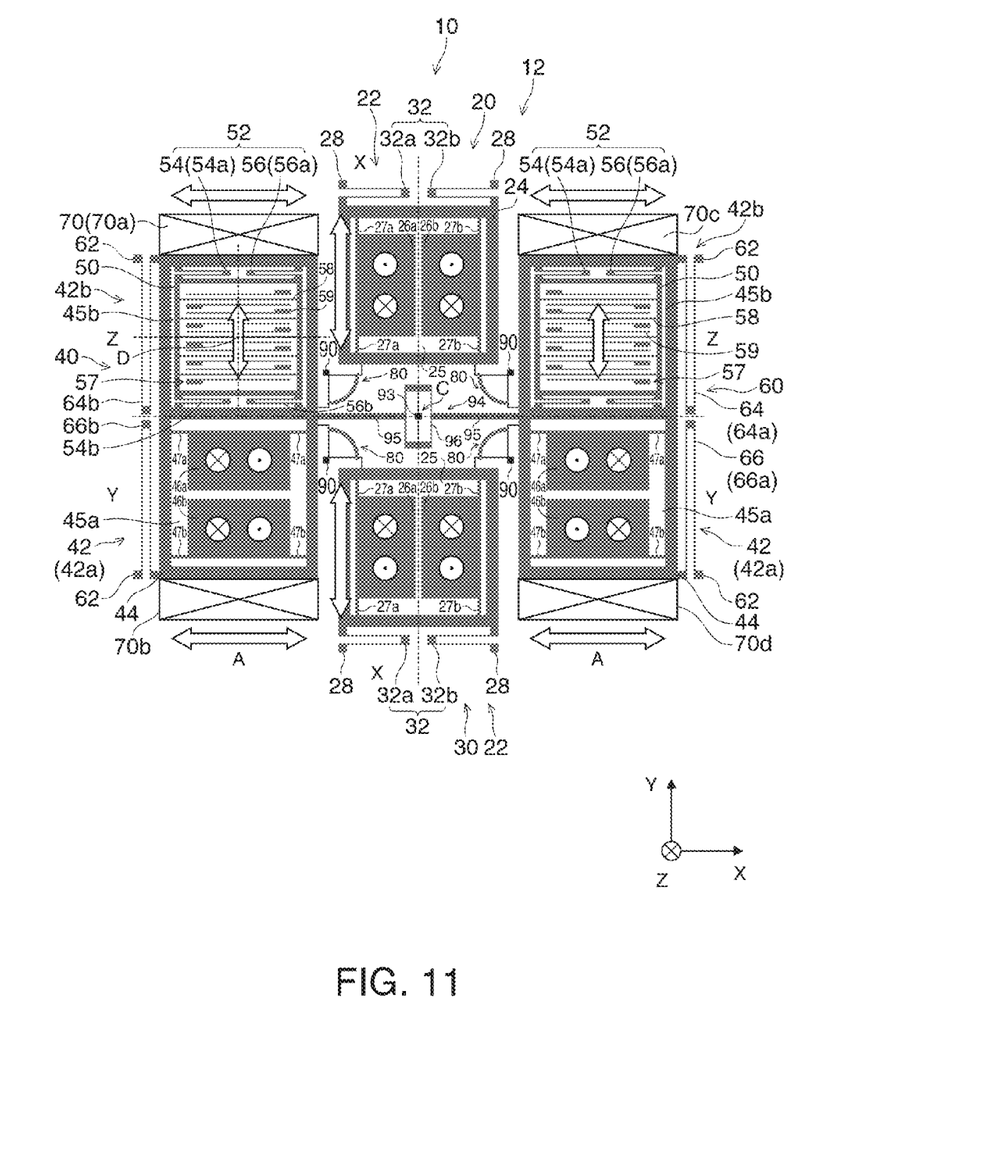
FIG. 11 is an explanatory view showing a modified example of the invention.

FIG. 11 is an explanatory view showing a modified example of the invention. As shown in the drawing, the modified example differs from the configuration of FIG. 1 in that a coupling spring 94 is formed between the first mass portion 40 and the third mass portion 60. The other configurations are similar to those of FIG. 1. Therefore, they are denoted by the same reference numerals and signs, and the detailed description thereof is omitted. The coupling spring 94 is composed of a first coupling spring portion 95 and a second coupling spring portion 96. The first coupling spring portion 95 extends in the X-axis direction passing through an anchor portion 93 arranged at the center C of the vibration system structure 12. The second coupling spring portion 96 extends in the Y-axis direction passing through the anchor portion 93. The first coupling spring portion 95 is a pair of supporting pieces having predetermined rigidity. One ends of the pair of supporting pieces are connected to the first mass portion 40 and the third mass portion 60, respectively, while the other ends are connected to the second coupling spring portion 96. The second coupling spring portion 96 is arranged between the pair of supporting pieces constituting the first coupling spring portion 95. The second coupling spring portion 96 is connected at the center to the anchor portion 93. The second coupling spring portion 96 extends in the Y-axis direction, and has rigidity lower than that of the first coupling spring portion 95. Therefore, the second coupling spring portion 96 easily deflects to deform when the first coupling spring portion 95 vibrates in the X-axis direction.

By disposing the coupling spring 94 having the configuration described above, there is an advantage that torsion is unlikely to occur when vibrations of the first mass portion 40 and the third mass portion 60 in the X-axis direction are converted to vibrations of the second mass portion 20 and the fourth mass portion 30 in the Y-axis direction.

Figure 12:
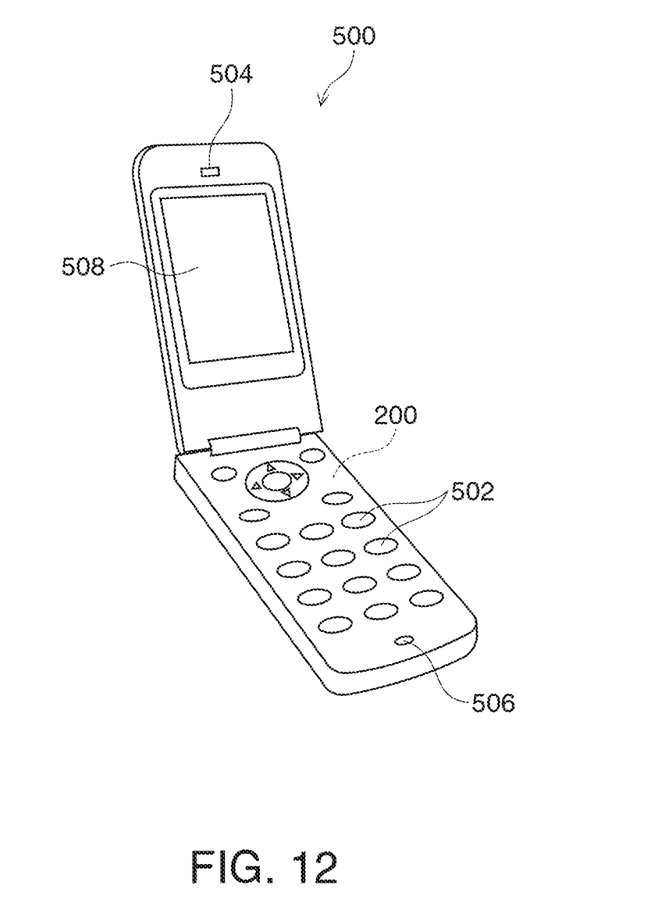
FIG. 12 is an explanatory view of a mobile phone to which an electronic device including the gyro sensor according to the invention is applied.

FIG. 12 is an explanatory view of a mobile phone to which an electronic device including the gyro sensor according to the invention is applied. As shown in the drawing, the mobile phone 500 includes a plurality of operation buttons 502, an earpiece 504, and a mouthpiece 506, and a display portion 508 is arranged between the operation buttons 502 and the earpiece 504. The mobile phone 500 described above incorporates therein the gyro sensor 10 functioning as angular velocity detecting means.

The entire disclosure of Japanese Patent Application No. 2011-113744, filed May 20, 2011 is expressly incorporated by reference herein.

What is claimed is:
1. A gyro sensor comprising:
a first mass portion including a first detection portion;
a second mass portion including a second detection portion;
a first drive portion vibrating the first mass portion in a direction of a first axis; and
a force conversion portion fixed to an anchor portion, wherein
the first mass portion and the second mass portion are connected with the force conversion portion,
the force conversion portion is displaced with the anchor portion as an axis, and vibrates the second mass portion in a direction of a second axis crossing the first axis in a plan view,
the force conversion portion includes:
a rotating body;

an anchor beam connecting the anchor portion with the rotating body;
a first connection beam connecting the rotating body with the first mass portion; and
a second connection beam connecting the rotating body with the second mass portion, and
the rotating body has rigidity higher than that of the anchor beam.

2. The gyro sensor according to claim 1, wherein
the anchor beam includes
a first anchor beam extending from the anchor portion in the direction of the first axis, and
a second anchor beam extending from the anchor portion in the direction of the second axis, and
the rotating body is a beam connecting an end of the first anchor beam with an end of the second anchor beam.

3. The gyro sensor according to claim 2, wherein
the rotating body is disposed in an arc shape.

4. The gyro sensor according to claim 1, wherein
the rotating body has a cavity, and
the anchor portion is arranged in the inside of the cavity.

5. The gyro sensor according to claim 1, wherein
a set of the anchor portions are disposed with the rotating body interposed therebetween.

6. The gyro sensor according to claim 5, wherein
the rotating body has a rectangle shape.

7. The gyro sensor according to claim 1, further comprising:
a third mass portion facing the first mass portion on the first axis and including a third detection portion; and
a second drive portion vibrating the third mass portion in the direction of the first axis opposite to the first mass portion, wherein
the force conversion portion is connected between the second mass portion and the third mass portion, and uses vibrations of the first mass portion and the third mass portion in the direction of the first axis to vibrate the second mass portion in the direction of the second axis.

8. The gyro sensor according to claim 7, further comprising:
a fourth mass portion facing the second mass portion on the second axis and including a fourth detection portion, wherein
the force conversion portion is connected between the third mass portion and the fourth mass portion, and between the first mass portion and the fourth mass portion, and
the force conversion portion uses vibrations of the first mass portion and the third mass portion in the direction of the first axis to vibrate the second mass portion in the direction of the second axis and vibrate the fourth mass portion in the direction of the second axis opposite to the second mass portion.

9. An electronic device comprising:
a display device that displays an image;
an input member that inputs information; and
a casing on which the display device and the input member are provided, the casing housing the gyro sensor according to claim 1.

* * * * *